US009649627B1

(12) United States Patent
Xiao et al.

(10) Patent No.: US 9,649,627 B1
(45) Date of Patent: May 16, 2017

(54) SINTER-RESISTANT LOW-COST CATALYSTS MANUFACTURED BY SOLUTION-BASED NANOPARTICLE COATING PROCESSES

(71) Applicant: GM Global Technology Operations LLC, Detroit, MI (US)

(72) Inventors: Xingcheng Xiao, Troy, MI (US); Ryan J. Day, Waterford, MI (US); Gongshin Qi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/010,937

(22) Filed: Jan. 29, 2016

(51) Int. Cl.
*B01J 23/00* (2006.01)
*B01J 37/02* (2006.01)
*B01J 23/40* (2006.01)
*B01J 37/08* (2006.01)

(52) U.S. Cl.
CPC .......... *B01J 37/0221* (2013.01); *B01J 23/40* (2013.01); *B01J 37/08* (2013.01)

(58) Field of Classification Search
CPC ......... B01J 37/0221; B01J 37/08; B01J 23/40
USPC ........................................................ 502/325
See application file for complete search history.

(56) References Cited

FOREIGN PATENT DOCUMENTS

CA         1323360 C      10/1993

OTHER PUBLICATIONS

Liang et al. "Stabilization of Supported Metal Nanoparticles Using an Ultrathin Porous Shell" ACS Catal., 2011, 1 (10), pp. 1162-1165, Aug. 15, 2011.*
M. Astier et al.; "Sintering and Catalysis"; vol. 10 of the series Materials Science Research; G.C. Kuczynski (ed.), Sintering and Catalysis, Plenum Press, New York, 1975; pp. 63 and 64.
Yang, Ming et al.; U.S. Appl. No. 15/399,151, filed Jan. 5, 2017 entitled "Ion Adsorption of Oxide Layers to Hinder Catalyst Sintering"; 44 pages.
Xiao, Xingcheng et al.; U.S. Appl. No. 15/399,179, filed Jan. 5, 2017 entitled "Solution-Based Approach to Make Porous Coatings for Sinter-Resistant Catalysts"; 46 pages.
Qi, Gongshin et al.; U.S. Appl. No. 15/419,263, filed Jan. 30, 2017 entitled "Highly Stable Platinum Group Metal (PGM) Catalyst Systems"; 37 pages.
Qi, Gongshin et al.; U.S. Appl. No. 15/418,214, filed Jan. 27, 2017 entitled "Sinter-Resistant Stable Catalyst Systems by Trapping of Mobile Platinum Group Metal (PGM) Catalyst Species"; 59 pages.

* cited by examiner

*Primary Examiner* — Colleen Dunn
*Assistant Examiner* — Haytham Soliman
(74) *Attorney, Agent, or Firm* — Harness, Dickey & Pierce, P.L.C.

(57) ABSTRACT

Catalysts that are resistant to high-temperature sintering and methods for preparing such catalysts that are resistant to sintering at high temperatures are provided. The catalysts include a metal nanoparticle bound to a metal oxide support, where the metal nanoparticle and support are coated with a porous metal oxide coating layer. The catalyst is prepared by contacting a metal nanoparticle bound to a metal oxide support with a solution of metal salts, drying the solution of metal salts, and calcining the metal salts to generate a porous metal oxide coating on the metal nanoparticle and metal oxide support.

11 Claims, 2 Drawing Sheets

SINTER-RESISTANT LOW-COST CATALYSTS MANUFACTURED BY SOLUTION-BASED NANOPARTICLE COATING PROCESSES

FIELD

The present disclosure relates to catalysts that are resistant to sintering at high temperatures and low-cost methods for preparing catalysts that are resistant to sintering at high temperatures.

BACKGROUND

This section provides background information related to the present disclosure which is not necessarily prior art.

Metal nanoparticles can make up the active sites of catalysts used in a variety of applications, such as for the production of fuels, chemicals and pharmaceuticals, and for emissions control from automobiles, factories, and power plants. Because metal nanoparticles tend to agglomerate, this decreases their surface area and active site accessibility, so they are often coupled to support materials. The supports physically separate the metal nanoparticles to prevent agglomeration, and to increase their surface area and active site accessibility. Thus, catalyst systems typically include one or more compounds; a porous catalyst support material; and one or more optional activators.

After continued use, especially at elevated temperatures, catalyst systems comprising supported metal nanoparticles lose catalytic activity due to sintering, e.g., thermal deactivation that occurs at high temperatures. Through various mechanisms, sintering results in changes in metal particle size distribution over a support and an increase in mean particle size; hence, a decrease in surface area for the active catalyst compounds. For example, particle migration and coalescence is a form of sintering where particles of metal nanoparticles move or diffuse across a support surface, or through a vapor phase, and coalesce with another nanoparticle, leading to nanoparticle growth. Ostwald ripening is another form of sintering wherein migration of mobile species are driven by differences in free energy and local atom concentrations on a support surface. After sintering processes occur, catalyst activity can decrease. Therefore, catalyst systems are often loaded with a sufficient amount of supported metal nanoparticles to account for a loss of catalytic activity over time and to continue to have the ability to meet, for example, emissions standards over a long period of operation at high temperature.

Various techniques have been employed to decrease sintering of metal nanoparticle catalysts. For example, metals have been alloyed with other metals, metal nanoparticles have been encapsulated with amorphous coatings by, for example, atomic layer deposition, and strong metal nanoparticle anchoring on supports have been attempted. However, these chemistry-based techniques have resulted in only limited success. Accordingly, there remains a need for improved catalysts that sinter-resistant.

SUMMARY

This section provides a general summary of the disclosure, and is not a comprehensive disclosure of its full scope or all of its features.

The present technology provides a method of preparing a catalyst system that is resistant to sintering. The catalyst system may include at least one catalyst active material and a porous support. The method includes contacting a particle bound to a support with a solution comprising a metal salt; precipitating the metal salts onto the particle and the support; and calcining the metal salts to generate a porous coating of metal oxide on the particle and support.

The present technology also provides another method of preparing catalyst system that is resistant to sintering. The method includes binding a nanoparticle catalyst to a support comprising a metal oxide; applying metal salts to surfaces of the nanoparticle catalyst and support; and heating the nanoparticle catalyst, support and metal salts at a temperature of greater than or equal to about 120° C. to less than or equal to about 180° C. for greater than or equal to about 2 minutes to less than or equal to about 60 minutes to generate a porous coating comprising metal oxide nanoparticles. The porous coating is disposed on the nanoparticle catalyst and support.

Also, the present technology provides a catalyst system that is resistant to sintering. The catalyst system includes a platinum group metal catalyst bound to a metal oxide support; and a coating of metal oxide nanoparticles disposed on the platinum group metal catalyst and metal oxide support. The coating in certain variations has a porosity of greater than or equal to about 20% to less than or equal to about 70%. The coating has an average pore size of greater than or equal to about 0.5 nm to less than or equal to about 30 nm, optionally greater than or equal to about 10 nm to less than or equal to about 30 nm and in other variations, an average pores size of greater than or equal to about 0.5 nm to less than or equal to about 20 nm, optionally greater than or equal to about 10 nm to less than or equal to about 20 nm. The catalyst is resistant to sintering.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
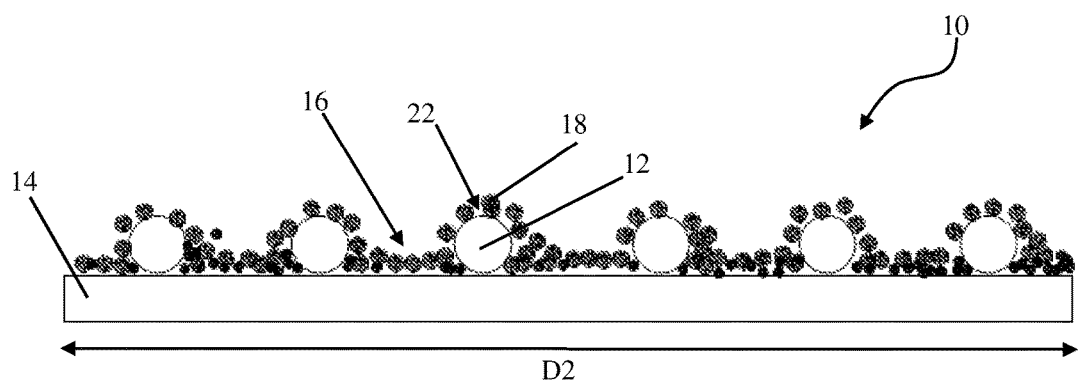
FIG. 1 is an illustration of a sinter-resistant catalyst system prepared according to certain aspects of the present technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

Chemistry-based approaches for stabilizing metal nanoparticles have been met with limited success. Accordingly, the present technology provides a solution-based approach for minimizing or eliminating sintering. This approach generates porous coatings on supported metal nanoparticles, which decreases catalyst activity loss by suppresses aging caused by sintering. The current solution-based approach, relative to other chemistry-based approaches, is a low cost wet-chemistry process, which results in a higher thermal durability and reduces catalyst metal loading requirements leading to significant cost savings. For example, relative to a conventional catalyst system having the same catalyst and support material, but lacking the porous coating, the present technology may reduce metal loading requirements by greater than or equal to 30%, greater than or equal to 40%, greater than or equal to 50%, greater than or equal to 60%, greater than or equal to 70%, greater than or equal to 80% or great than or equal to 90%, such as from about 30% to about 90%, from about 40% to about 80%, from about 50%, to about 80%, from about 60% to about 80%, or from about 70% to about 80%.

Accordingly, the present technology provides a method for preparing a catalyst through a solution-based approach. The method comprises binding at least one nanoparticle catalyst to a support comprising a metal oxide. The nanoparticle catalyst comprises a platinum group metal (PGM) nanoparticle, such as one or more nanoparticles of ruthenium, rhodium, palladium, osmium, iridium, or platinum, a noble metal, such as one or more nanoparticles of Re, Cu, Ag, Au, or Hg, other metals, such as one or more nanoparticles of Na, K, Mg, Ca, or Ba, or combinations thereof. The nanoparticle catalyst may have a maximum diameter of greater than or equal to about 2 nm to less than or equal to about 10 nm, such as a diameter of about 2 nm, about 3 nm, about 4 nm, about 5 nm, about 6 nm, about 7 nm, about 8 nm, about 9 nm, or about 10 nm.

The catalyst support may comprise a metal oxide selected from the group consisting of $Al_2O_3$, $CeO_2$, $ZrO_2$, $TiO_2$, $SiO_2$, MgO, ZnO, BaO, $K_2O$, $Na_2O$, CaO and combinations thereof. The support has a diameter of greater than or equal to about 0.8 µm to less than or equal to about 5 µm, greater than or equal to 1 µm to less than or equal to about 4 µm, greater than or equal to 1.5 µm to less than or equal to about 3.5 µm, or greater than or equal to 2 µm to less than or equal to about 3 µm, such as a diameter of about 0.8 µm, 1 µm, 1.5 µm, 2 µm, 2.5 µm, 3 µm, 3.5 µm, 4 µm, 4.5 µm, or 5 µm.

After obtaining a catalyst particle bound to a catalyst support, also referred to herein as a "supported nanoparticle," the method comprises contacting the supported nanoparticle with a solution comprising a metal salt dissolved in a solvent. In various embodiments, the metal salt is a salt of Al, Ce, Zr, Ti, Si, Mg, Zn, Ba, K, Na, Ca or combinations thereof. Additionally, the metal salt may have a concentration of greater than or equal to about 1 wt. % to less than or equal to about 50 wt. % relative to the weight of the catalyst support. As non-limiting examples, salts of Al include $AlCl_3$, $Al(NO_3)_3$, $Al(OH)_3$, $Al_2(SO_4)_3$, $Al(ClO_3)_3$, $AlO_4P$, and $Al(PO_3)_3$; salts of Ce include $Ce(NO_3)_3$, $Ce(OH_4)$, $Ce_2(SO_4)_3$, and $Ce(SO_4)_2$; salts of Zr include $Zr(HPO_4)_2$, $Zr(OH)_4$, and $Zr(SO_4)_2$; salts of Ti include $TiOSO_4$ and $TiOPO_4$; salts of Si include $SiPO_4(OH)$; salts of Mg include $MgSO_4$, $Mg(NO_3)_2$, $MgHPO_4$, and $Mg_3(PO_4)_2$; salts of Zn include $Zn(NO_3)_2$, $Zn_3(PO_4)_2$, and $ZnSO_4$; salts of Ba include $BaCO_3$, $BaCl_2$, and $BaCrO_4$; salts of K include $KHSO_4$, $KCl$, $K_2CO_3$, $K_2CrO_4$, $K_2Cr_2O_7$, $KOH$, $KIO_3$, $KI$, $K_2MnO_4$, $KVO_3$, $K_2MoO_4$, $KNO_3$, $KClO_4$, $K_2S_2O_8$, $K_2HPO_4$, $K_4P_2O_7$, and $K_2SO_4$; salts of Na include $NaBr$, $NaCl$, $Na_2CO_3$, $Na_2CrO_4$, $HCOONa$, $NaHSO_4$, $NaOH$, $NaBO_2$, $Na_2O_3Si$, $NaVO_3$, $Na_2MoO_4$, $NaNO_3$, $NaOOCCOONa$, $NaMnO_4$, $Na_3PO_4$, $Na_2HPO_4$, $Na_2H_2P_2O_7$, $Na_4P_2O_7$, $Na_2SO_4$, and $Na_3P_3O_9$; salts of Ca include $CaCl_2$, $CaCO_3$, $CaFPO_3$, $Ca(OH)_2$, $Ca(IO_3)_2$, $Ca(NO_3)_2$, $Ca(NO_2)_2$, $CaC_2O_4$, $Ca(H_2PO_4)_2$, $Ca_2P_2O_7$, and $CaSO_4$; and any combinations of these salts. The solvent is non-limiting, and can be water, an alcohol, or other organic solute.

Next, the method comprises applying the metal salts to surfaces of the catalyst nanoparticle and catalyst support. Applying the metal salts to the surfaces of the nanoparticle and support includes removing the solvent from the supported nanoparticles, such as, for example, by evaporation or drying, and precipitating the metal salt on the surfaces of the nanoparticle and support. In various embodiments, evaporating or drying the solvent is performed by increasing the temperature or decreasing the pressure about the supported nanoparticle in contact with the metal salt solution to facilitate precipitation of the metal salt on the surfaces of the nanoparticle and support. In various embodiments, drying is performed at a temperature of greater than or equal to about 50° C. to less than or equal to about 250° C., such as at a temperature of about 50° C., about 100° C., about 150° C., about 200° C., or about 250° C. Drying is performed for a time of greater than or equal to about 2 minutes to less than or equal to about 60 minutes, such as for a time of about 2 minutes, about 4 minutes, about 6 minutes, about 8 minutes, about 10 minutes, about 20 minutes, about 40 minutes, or about 60 minutes. However, it is understood that other temperatures and durations may be used to remove solvent from supported nanoparticles.

The method also comprises calcining the metal salts to generate a crystalline, porous coating of metal oxide on the particle and support, wherein the metal oxide is derived from the metal salt. The porous coating has a porosity, i.e., a volume of pores relative to the volume of coating, of greater than or equal to about 20% to less than or equal to about 70%, such as a porosity of about 20%, about 30%, about 40%, about 50%, about 60%, or about 70%. In some embodiments, the applying the metal salts to surfaces of the catalyst nanoparticle and catalyst support and the calcining are performed concurrently. Calcining includes heating the nanoparticle catalyst, support and metal salts at a temperature of greater than or equal to about 100° C. to less than or equal to about 1,000° C., such as at a temperature of about 100° C., about 150° C., about 200° C., about 250° C., about 300° C., about 350° C., about 400° C., about 450° C., about 500° C., about 550° C., about 600° C., about 650° C., about 700° C., about 750° C., about 800° C., about 850° C., about 900° C., about 950° C., or about 1,000° C., for a time of greater than or equal to about 20 minutes to less than or equal to about 5 hours, such as for time of about 20 minutes, about 30 minutes, about 40 minutes, about 1 hours, about 1.5 hours, about 2.0 hours, about 2.5 hours, about 3.0 hours, about 3.5 hours, about 4.0 hours, about 4.5 hours, or about 5.0 hours to generate a porous coating of metal oxide nanoparticles on the nanoparticle and support. In various aspects, the temperature applied during calcining does not exceed the melting point of the metal oxide derived from the metal salt. Non-limiting examples of metal oxides formed from the metal salts include $Al_2O_3$, $CeO_2$, $ZrO_2$, $TiO_2$, $SiO_2$, $MgO$, $ZnO$, $BaO$, $K_2O$, $Na_2O$, $CaO$, and combinations thereof. The metal oxide nanoparticles have a maximum diameter of greater than or equal to about 0.5 nm to less than or equal to about 50 nm, greater than or equal to about 1 nm to less than or equal to about 25 nm, or greater than or equal to about 2 nm to less than or equal to about 10 nm, such as a diameter of about 0.5 nm, about 1 nm, about 2 nm, about 3 nm, about 4 nm, about 5 nm, about 10 nm, about 15 nm, about 20 nm, about 25 nm, about 30 nm, about 35 nm, about 40 nm, about 45 nm, or about 50 nm.

Figure 2:
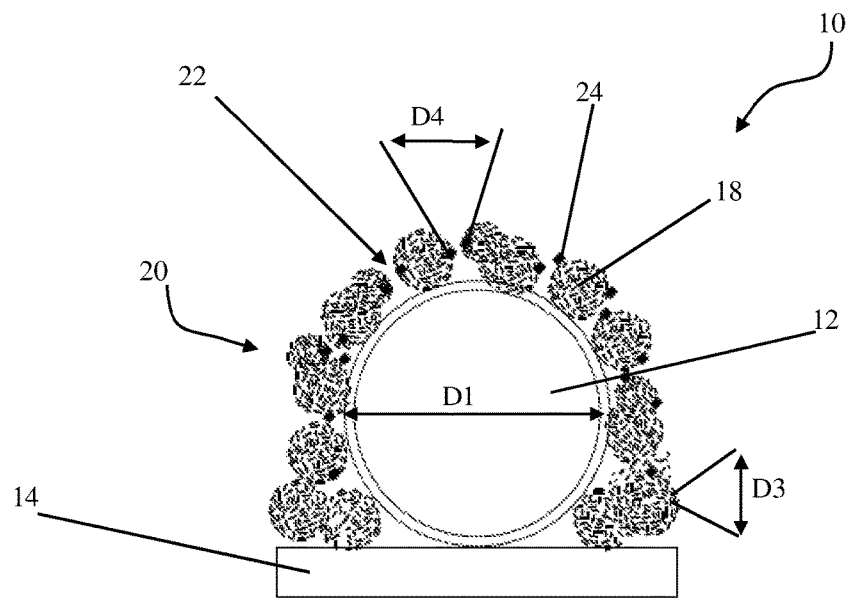
FIG. 2 is an exploded view of a portion of FIG. 1 showing a metal nanoparticle catalyst bound to a metal oxide support and a porous coating disposed on the metal nanoparticle catalyst and the metal oxide support.

With reference to FIG. 1, the current technology also provides a catalyst system 10 that resists sintering and retains catalytic activity after prolonged exposures to elevated temperatures. The catalyst system 10 can be a catalyst system generated by the method provided herein. The catalyst includes metal nanoparticles 12 (catalysts) bound to a catalyst metal oxide support 14 and a crystalline coating 16 of metal oxide nanoparticles 18 disposed on the metal nanoparticles 12 and on the metal oxide support 14. In various embodiments, the metal nanoparticles 12 are either directly or indirectly coupled to the metal oxide support 14. The metal nanoparticles 12 have a loading density on the catalyst support of greater than or equal to about 0.25% (w/w) to less than or equal to about 10% (w/w), such as a loading density of about 0.25% (w/w), about 0.5% (w/w), about 1.0% (w/w), about 1.5% (w/w), about 2.0% (w/w), about 2.5% (w/w), about 3.0% (w/w), about 3.5% (w/w), about 4.0% (w/w), about 4.5% (w/w), about 5.0% (w/w), about 5.5% (w/w), about 6.0% (w/w), about 6.5% (w/w), about 7.0% (w/w), about 7.5% (w/w), about 8.0% (w/w), about 8.5% (w/w), about 9.0% (w/w), about 9.5% (w/w), or about 10.0% (w/w). In some embodiments, the loading density of the metal nanoparticles 12 on the metal oxide support 14 is about 1.5% (w/w). An exploded view of the catalyst system 10 showing a metal nanoparticle 12 bound to a metal oxide support 14, i.e., a supported nanoparticle 20, is shown in FIG. 2.

As described above in regard to the method of preparing a catalyst, the nanoparticles 12 may comprise platinum group metal (PGM) nanoparticles, such as nanoparticles of Ru, Rh, Pd, Os, Ir, or Pt, a noble metal, such as nanoparticles of Re, Cu, Ag, Au, or Hg, other metals, such as nanoparticles of Na, K, Mg, Ca, or Ba, or combinations thereof. In certain variations, the nanoparticles may have a maximum average diameter D1 of greater than or equal to about 2 nm to less than or equal to about 10 nm, such as a diameter of about 2 nm, about 3 nm, about 4 nm, about 5 nm, about 6 nm, about 7 nm, about 8 nm, about 9 nm, or about 10 nm.

The metal oxide support 14 optionally comprises a metal oxide selected from the group consisting of $Al_2O_3$, $CeO_2$, $ZrO_2$, $TiO_2$ $SiO_2$, MgO, ZnO, BaO, $K_2O$, $Na_2O$, CaO, and combinations thereof. Nonetheless, it is understood that this group of metal oxides is not limited and that other metal oxides may be employed for the support 14. The support 14 has a maximum average diameter D2 of greater than or equal to about 0.8 μm to less than or equal to about 5 μm, greater than or equal to 1 μm to less than or equal to about 4 μm, greater than or equal to 1.5 μm to less than or equal to about 3.5 μm, or greater than or equal to 2 μm to less than or equal to about 3 μm, such as a diameter of about 0.8 μm, about 1 μm, about 1.5 μm, about 2 μm, about 2.5 μm, about 3 μm, about 3.5 μm, about 4 μm, about 4.5 μm, or about 5 μm. It should be noted the catalyst metal oxide support 14 may have shapes or forms other than a planar structure as shown in FIG. 1, for example, it may have conventional monolith or honeycomb shapes or the catalyst support may be in the form of beads for a packed bed catalyst, as known in the art. Moreover, the metal oxide support 14 has a surface area of greater than or equal to about 50 $m^2/g$ to less than or equal to about 150 $m^2/g$, greater than or equal to about 75 $m^2/g$ to less than or equal to about 125, $m^2/g$ such as a surface area of about 75 $m^2/g$, about 80 $m^2/g$, about 90 $m^2/g$, about 100 $m^2/g$, about 110, $m^2/g$ about 120 $m^2/g$, about 130 $m^2/g$, about 140 $m^2/g$, about 145 $m^2/g$, or about 150 $m^2/g$.

The crystalline coating 16 includes metal oxide nanoparticles 18, such as, for example, $Al_2O_3$, $CeO_2$, $ZrO_2$, $TiO_2$, $SiO_2$, MgO, ZnO, BaO, $K_2O$, $Na_2O$, CaO, and combinations thereof. The metal oxide nanoparticles have an average maximum diameter D3 of greater than or equal to about 0.5 nm to less than or equal to about 50 nm, greater than or equal to about 1 nm to less than or equal to about 25 nm, or greater than or equal to about 2 nm to less than or equal to about 10 nm, such as a diameter of about 0.5 nm, about 1 nm, about 2 nm, about 3 nm, about 4 nm, about 5 nm, about 10 nm, about 15 nm, about 20 nm, about 25 nm, about 30 nm, about 35 nm, about 40 nm, about 45 nm, or about 50 nm. Nonetheless, the coating 16 comprising the metal oxide nanoparticles 18 is crystalline.

The crystalline coating 16 of metal oxide nanoparticles 18 covers greater than or equal to about 5% to less than or equal to about 100% of the surface area of the platinum group metal catalyst and metal oxide support and comprises a plurality of pores 22, i.e., is porous, such that reacting gas molecules can access the metal nanoparticles 12 having catalytic activity, yet metal particles or vapors 24 are prevented from coalescing with the metal nanoparticles 12. Therefore, the coating 16 renders the catalyst system 10 resistant to sintering or thermal degradation by increasing the surface area of the catalyst system 10 and trapping or depositing the particles or vapors 24 generated from particle migration and coalescence or Ostwald ripening resulting from the catalyst system 10 being continuously subjected to elevated temperatures. Moreover, particles 24 trapped or deposited in the pores 22 or the coating 16 retain catalytic activity, which can be expressed as catalytic metal dispersion.

"Catalyst metal dispersion" refers to a ratio of metal catalyst 12 surface sites to a mass of an entire catalyst system 10. Therefore a catalyst system with a high dispersion will have smaller and more highly dispersed metal catalysts relative to a catalyst system with a low dispersion. Relative to a catalyst system equivalent to the catalyst system 10 described herein, but without a porous coating, a catalyst system having an increased resistance to sintering has a dispersion loss of less than about 74% after exposure to a temperature of about 650° C. for a time period of about 2 hours. A catalyst system that that resists sintering is a catalyst system that undergoes a dispersion loss of less than or equal to about 20%, less than or equal to about 15%, or less than or equal to about 10% after exposure to a temperature of about 650° C. for a time period of about 2 hours.

In various embodiments, the pores have an average diameter D4 of greater than or equal to about 0.5 nm to less than or equal to about 30 nm, such as a diameter of about 0.5 nm, about 1.0 nm, about 2.0 nm, about 3.0 nm, about 4.0 nm, about 5.0 nm, about 6.0 nm, about 7.0 nm, about 8.0 nm, about 9.0 nm, about 10.0 nm, about 11.0 nm, about 12.0 nm, about 13.0 nm, about 14.0 nm, about 15.0 nm, about 16.0 nm, about 17.0 nm, about 18.0 nm, about 19.0 nm, or about 20.0 nm. In various embodiments, the coating 16 covers greater than or equal to about 5% to less than or equal to about 100% of the surface area including the exposed surfaces of the metal nanoparticles 12 and the catalyst support 14, or greater than or equal to about 20% to less than or equal to about 90% of the combined surface area of exposed surfaces of the metal nanoparticle 12 and the support 14. In various embodiments, the coating 16 covers about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% of the surface area including the exposed surfaces of the metal nanoparticles 12 and the catalyst support 14. Moreover, the coating 16 has a porosity of greater than or equal to about 20% to less than or equal to about 70%, such as a porosity of about 20%, about 30%, about 40%, about 50%, about 60%, or about 70%.

In certain embodiments, the metal oxide nanoparticles 18 of the coating 16 comprise the same metal oxide composition as the metal oxide support 14 composition. In other embodiments, the metal oxide nanoparticles 18 of the coating 16 comprise a different metal oxide as the support 14. In yet other embodiments, the coating 16 comprises a plurality of different metal oxides. Therefore, the catalyst system 10 may include a single species of metal nanoparticle 12 and metal oxide support 14 or a plurality of metal nanoparticles 12 and metal oxide supports 14. Embodiments of the present technology are further illustrated through the following non-limiting examples.

Example 1

A powder of supported nanoparticles comprising PGM nanoparticles bound to an $Al_2O_3$ (alumina) support is contacted with an aqueous solution of $Al^{3+}$. The solution is dried to remove water at 150° C. for 10 minutes and then calcined at 500° C. for 2 hours to generate a porous alumina coating over the supported nanoparticles, referred to as "coated-supported nanoparticles."

Figure 3:
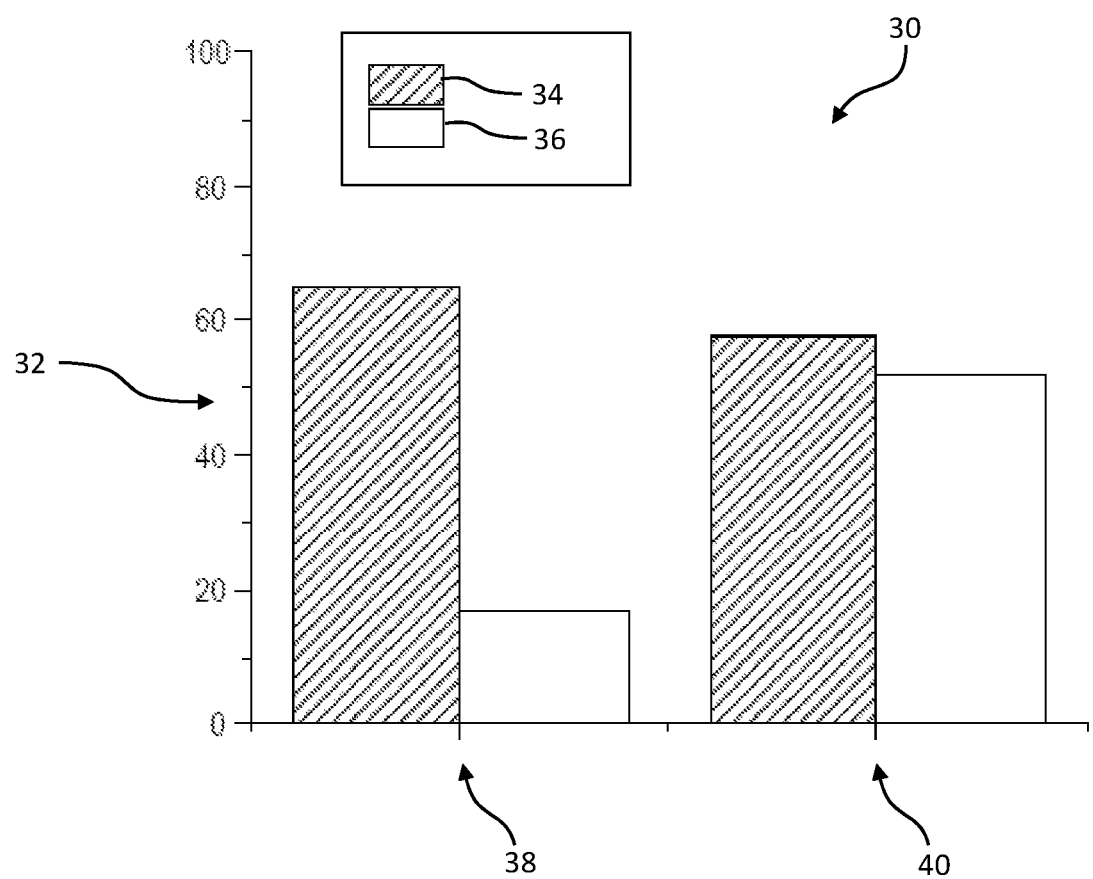
FIG. 3 is a graph showing the results of a dispersion test.

The coated-supported nanoparticles and a control of supported nanoparticles without a coating are subjected to aging conditions by heating to 650° C. for 2 hours in air. The coated-supported nanoparticles and control supported nanoparticles are then subjected to a dispersion test wherein absorption of gases is measured to determine the amount of PGM nanoparticle dispersion. Results of the dispersion test are shown in a graph 30 of FIG. 3. The graph 30 shows dispersion (5) 32, before again 34 and after aging 36 for a control of supported nanoparticles without a coating 38 and coated-supported nanoparticles 40. Here, about 75% of the PGM nanoparticles were lost in the control supported nanoparticles 38 after aging 36 relative to the control supported nanoparticles 38 prior to aging 34. However, only about 10% of the PGM nanoparticles were lost in the coated-supported nanoparticles 40 after aging 36 relative to the coated-supported nanoparticles 40 prior to aging 34. These results demonstrate sinter resistance in the coated-supported PGM nanoparticles.

To evaluate activity, a CO oxidation reaction is used ($CO+O_2$). A stream of 0.5% CO, 0.5% $O_2$, and 5% $H_2O$ is flowed over the catalysts as reaction temperature is increased. The total flow rate is 0.5 L/min with the balance consisting of $N_2$ gas. The amount of CO detected post-catalyst is measured to evaluate the extent of the reaction. A metric used to evaluate activity is $T_{50}$, which is the temperature at which 50% of the CO stream is being oxidized over the catalyst. After subjecting the control of supported nanoparticles and the coated-supported nanoparticles the gaining conditions described above, the control of supported nanoparticles and the coated-supported nanoparticles provided $T_{50}$ values of 208° C. and 200° C., respectively.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing a catalyst system, the method comprising:
    contacting a nanoparticle bound to a support with a solution comprising a metal salt, wherein the nanoparticle is selected from the group consisting of: ruthenium (Ru) nanoparticle, rhodium (Rh) nanoparticle, palladium (Pd) nanoparticle, osmium (Os) nanoparticle, iridium (Ir) nanoparticle, platinum (Pt) nanoparticle, rhenium (Re) nanoparticle, copper (Cu) nanoparticle, silver (Ag) nanoparticle, gold (Au) nanoparticle, mercury (Hg) nanoparticle, sodium (Na) nanoparticle, potassium (K) nanoparticle, magnesium (Mg) nanoparticle, calcium (Ca) nanoparticle, barium (Ba) nanoparticle, and combinations thereof and the metal salt comprises a metal selected from the group consisting of: aluminum (Al), cerium (Ce), zirconium (Zr), titanium (Ti), silicon (Si), magnesium (Mg), zinc (Zn), sodium (Na), potassium (K), barium (Ba), calcium (Ca), and combinations thereof;
    precipitating the metal salts onto the particle and the support; and
    calcining the metal salts to generate a porous coating of metal oxide on the particle and support.

2. The method according to claim 1, wherein the contacting a particle bound to a support with a solution comprising a metal salt comprises contacting a particle bound to a support comprising a metal oxide.

3. The method according to claim 2, wherein the metal oxide is $CeO_2$ or $Al_2O_3$.

4. The method according to claim 1, wherein the metal salt is $AlCl_3$, $Al(NO_3)_3$, $Al(OH)_3$, $Al_2(SO_4)_3$, $Al(ClO_3)_3$, $AlO_4P$, $Al(PO_3)_3$, or a combination thereof.

5. The method according to claim 1, wherein the precipitating the metal salts onto the particle and the support comprises drying the solution comprising a metal salt to remove water and facilitate the precipitating.

6. The method according to claim 1, wherein the calcining comprises heating the metal salts and the particle bound to the support at from about 100° C. to about 1000° C. for from about 20 minutes to about 5 hours.

7. A method of preparing a catalyst system, the method comprising:
    binding a nanoparticle catalyst to a support comprising a metal oxide, wherein the nanoparticle is selected from the group consisting of: ruthenium (Ru) nanoparticle, rhodium (Rh) nanoparticle, palladium (Pd) nanoparticle, osmium (Os) nanoparticle, iridium (Ir) nanoparticle, platinum (Pt) nanoparticle, rhenium (Re) nanoparticle, copper (Cu) nanoparticle, silver (Ag) nanoparticle, gold (Au) nanoparticle, mercury (Hg) nanoparticle, sodium (Na) nanoparticle, potassium (K) nanoparticle, magnesium (Mg) nanoparticle, calcium (Ca) nanoparticle, barium (Ba) nanoparticle, and combinations thereof;
    applying metal salts to surfaces of the nanoparticle catalyst and support, wherein the metal salts comprise a metal selected from the group consisting of: aluminum (Al), cerium (Ce), zirconium (Zr), titanium (Ti), silicon (Si), magnesium (Mg), zinc (Zn), sodium (Na), potassium (K), barium (Ba), calcium (Ca), and combinations thereof; and
    heating the nanoparticle catalyst, support and metal salts at a temperature of greater than or equal to about 100° C. to less than or equal to about 1000° C. for greater than or equal to about 20 minutes to less than or equal to about 5 hours to generate a porous coating comprising metal oxide nanoparticles disposed on the nanoparticle catalyst and the support.

8. The method according to claim 7, wherein the support comprises a metal oxide selected from the group consisting of $Al_2O_3$, $CeO_2$, $ZrO_2$, $TiO_2$, $SiO_2$, MgO, ZnO, BaO, $K_2O$, $Na_2O$, CaO, and combinations thereof.

9. The method according to claim 7, wherein the applying metal salts to surfaces of the nanoparticle catalyst and support comprises:
    contacting the nanoparticle catalyst bound to the support with a solution comprising a metal salt dissolved in a solvent;
    evaporating the solvent; and
    precipitating the metal salt on surfaces of the nanoparticle catalyst and support.

10. The method according to claim 9, wherein the metal salt dissolved in the solvent is selected from the group consisting of $AlCl_3$, $Al(NO_3)_3$, $Al(OH)_3$, $Al_2(SO_4)_3$, $Al(ClO_3)_3$, $AlO_4P$, $Al(PO_3)_3$, $Ce(NO_3)_3$, $Ce(OH_4)$, $Ce_2(SO_4)_3$, $Ce(SO_4)_2$, $Zr(HPO_4)_2$, $Zr(OH)_4$, $Zr(SO_4)_2$, $TiOSO_4$, $TiOPO_4$, $SiPO_4(OH)$, $MgSO_4$, $Mg(NO_3)_2$, $MgHPO_4$, $Mg_3(PO_4)_2$, $Zn(NO_3)_2$, $Zn_3(PO_4)_2$, $ZnSO_4$, $BaCO_3$, $BaCl_2$, $BaCrO_4$, $KHSO_4$, KCl, $K_2CO_3$, $K_2CrO_4$, $K_2Cr_2O_7$, KOH, $KIO_3$, KI, $K_2MnO_4$, $KVO_3$, $K_2MoO_4$, $KNO_3$, $KClO_4$, $K_2S_2O_8$, $K_2HPO_4$, $K_4P_2O_7$, $K_2SO_4$, NaBr, NaCl, $Na_2CO_3$, $Na_2CrO_4$, HCOONa, $NaHSO_4$, NaOH, $NaBO_2$, $Na_2O_3Si$, $NaVO_3$, $Na_2MoO_4$, $NaNO_3$, NaOOCCOONa, $NaMnO_4$, $Na_3PO_4$, $Na_2HPO_4$, $Na_2H_2P_2O_7$, $Na_4P_2O_7$, $Na_2SO_4$, $Na_3P_3O_9$, $CaCl_2$, $CaCO_3$, $CaFPO_3$, $Ca(OH)_2$, $Ca(IO_3)_2$, $Ca(NO_3)_2$, $Ca(NO_2)_2$, $CaC_2O_4$, $Ca(H_2PO_4)_2$, $Ca_2P_2O_7$, $CaSO_4$, and combinations thereof.

11. The method according to claim 7, wherein the heating comprises heating at a temperature of about 550° C. for about 2 hours.

* * * * *